March 29, 1932.   M. WELLAUER   1,851,792
TRANSFORMER FOR POLYPHASE RECTIFIERS
Filed June 5, 1928
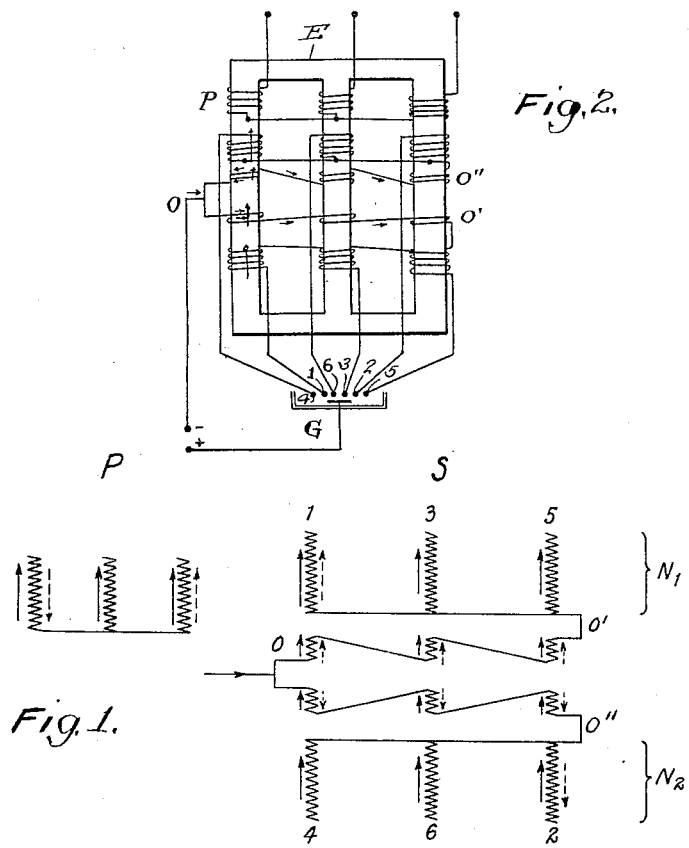
INVENTOR
Max Wellauer
Moses & Nolte,
Attorneys.

Patented Mar. 29, 1932

1,851,792

UNITED STATES PATENT OFFICE

MAX WELLAUER, OF OERLIKON, SWITZERLAND, ASSIGNOR TO MASCHINENFABRIK OERLIKON, OF OERLIKON, SWITZERLAND, A CORPORATION OF SWITZERLAND

TRANSFORMER FOR POLYPHASE RECTIFIERS

Application filed June 5, 1928, Serial No. 283,105, and in Switzerland June 11, 1927.

The present invention relates to a circuit arrangement for polyphase rectifier-transformer with $n$ phases, by means of which the conditions of current and voltage in the transformer and rectifier can be influenced in the same manner as is accomplished in known arrangements, by means of compensating choke coils attached at two zero points of the transformer. By comparison with this combination of transformers and compensating choke coils, the new arrangement gives the advantage of providing a complete closed unit with a saving of weight, space and cost.

The disposition and operation of the new circuit arrangement will be described with reference to the accompanying drawings in which:—Fig. 1 is a diagram for a 6-phase transformer, loaded with a 6-phase rectifier, and Fig. 2 is a diagram of a 6-phase transformer the six phases of which are each connected to a separate anode of a 6-anode rectifier.

Referring more particularly to Fig. 1:

The secondary winding S of the transformer diagrammatically indicated in Fig. 1 comprises two 3-phase systems $N^1$ and $N^2$ which are mutually displaced by 180° and have their phase windings indicated by 1, 3, 5 and 4, 6, 2 respectively star connected. The two neutral points O' and O'' are connected to two sets of windings O O' and O O'' each comprising three coil elements. The three individual coil elements of each winding are arranged so that one is mounted on each of the phase cores carrying the secondary windings 1, 3, 5 and 4, 6, 2 respectively, while the coils are interconnected so that the direct currents entering the 3-phase systems $N^1$, $N^2$ at O' and O'' respectively produce opposed magnetic fields. The connection and arrangement of the coils of the windings is however such that the magnetizing effect of each coil acts in the same direction as the flux produced by the corresponding phase of that secondary winding to which the auxiliary winding is connected. The direction taken by each anode current of a system is indicated by broken-line arrows in the diagram, whilst the E. M. F.'s belonging to the individual coils are indicated by full-line arrows. The effect of the described circuit arrangement of the phase and auxiliary windings is that the two 3-phase systems of the 6-phase transformer act in the same way as two 3-phase systems connected in parallel. The advantages of this method of operating have been set out in literature (e. g. "The Electric Journal," October 1927, p. 486) namely: Reduced current loading of the phases in relation to a given D. C., smaller D. C. voltage drop for a given short-circuit voltage and favourable D. C. curve. As experiments and theoretical considerations have shown it is necessary for the primary of the transformer to be in star connection in order that the triple-frequency magnetization impressed on the transformer core may be distributed uniformly over all three cores. The normal yoke dispersion of the transformer suffices to produce the requisite voltage compensation in the windings O O' O O''.

Fig. 2 shows how the various phases of two $n$-phase star-connected secondary systems are each connected to a separate anode of a rectifier.

The phases of the one system, corresponding to the system $N_1$ of Fig. 1, are denoted 1, 3, 5 and the phases of the other system, corresponding to the system $N_2$ of Fig. 1, are denoted 4, 6, 2. Each phase is, as indicated in the diagram, connected to a separate anode of a rectifier G.

The set of windings O O' is connected to the zero point of the phases 1, 3, 5, whereas the other set of windings O O'' is connected to the zero point of the phases 2, 6, 4 as shown in regard to the two systems $N_1$ $N_2$ of Fig. 1.

E is the iron core.

I claim:—

1. In combination a polyphase transformer and a polyphase rectifier, star-connected primary windings of said transformer, two sets of star-connected secondary windings of said transformer mutually displaced by 180°, and two auxiliary windings of said transformer respectively connected each to the zero point of a different one of said sets of secondary windings and each so disposed as to generate a stray flux in opposition to the flux of the secondary winding which generates a phase current which is at 180° to the phase current generated by the secondary winding to which said auxiliary winding is connected, said secondary windings being connected each to a separate anode of said rectifier.

2. In combination a polyphase transformer and a polyphase rectifier, star-connected primary windings of said transformer, two sets of star-connected secondary windings of said transformer mutually displaced by 180°, and two sets of auxiliary windings of said transformer respectively connected each to the zero point of a different one of said sets of secondary windings and each so disposed as to generate a stray flux in opposition to the flux of the secondary winding which generates a phase current which is at 180° to the phase current generated by the secondary winding to which said auxiliary winding is connected, said secondary windings being connected each to a separate anode of said rectifier.

3. In combination a polyphase rectifier and a polyphase transformer with star-connection on the primary side and having in the secondary two $n$-phase systems in star-connection and mutually displaced by 180°, in which, in addition to the $n$-phase windings the transformer contains at least two auxiliary windings, uniformly distributed on the cores, to which auxiliary windings the zero points of the $n$-phase systems are connected in such a manner that the anode currents issuing from a polyphase system generate a stray flux which acts in opposition to the flux of the anode current of the system which generates a phase current displaced by 180° to the phase current generated by said polyphase system.

In testimony whereof, I affix my signature.

MAX WELLAUER.